United States Patent
Hickerson et al.

(10) Patent No.: US 12,481,577 B2
(45) Date of Patent: Nov. 25, 2025

(54) INSTRUCTION STREAM RETROGRADING TO ENHANCE RANDOM TEST GENERATION

(71) Applicant: International Business Machines Corporation, Armonk, NY (US)

(72) Inventors: Bryan G. Hickerson, Cedar Park, TX (US); Craig Atherton, Burlington, VT (US); Michal Rimon, Nofit (IL); Avishai Moshe Fedida, Gesher Ha'Ziv (IL); Ofer Peled, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/450,615

(22) Filed: Aug. 16, 2023

(65) Prior Publication Data

US 2025/0061050 A1    Feb. 20, 2025

(51) Int. Cl.
| | |
|---|---|
| *G06F 11/36* | (2025.01) |
| *G06F 9/30* | (2018.01) |
| *G06F 9/46* | (2006.01) |
| *G06F 9/48* | (2006.01) |
| *G06F 11/3668* | (2025.01) |
| *G06F 11/263* | (2006.01) |

(52) U.S. Cl.
CPC ........ *G06F 11/3688* (2013.01); *G06F 9/3005* (2013.01); *G06F 11/3684* (2013.01); *G06F 9/462* (2013.01); *G06F 9/4881* (2013.01); *G06F 11/263* (2013.01)

(58) Field of Classification Search
CPC ............. G06F 11/3688; G06F 11/3684; G06F 11/3664; G06F 11/263; G06F 9/3005; G06F 9/4881; G06F 9/462
See application file for complete search history.

(56) References Cited

U.S. PATENT DOCUMENTS

| | | |
|---|---|---|
| 7,133,816 B2 | 11/2006 | Adir |
| 7,877,742 B2 | 1/2011 | Duale |
| 8,826,075 B2 | 9/2014 | Katz |

(Continued)

FOREIGN PATENT DOCUMENTS

WO    2021247102 A1    12/2021

OTHER PUBLICATIONS

A. Adir et al., "Genesys-Pro: innovations in test program generation for functional processor verification," in IEEE Design & Test of Computers, vol. 21, No. 2, pp. 84-93, Mar.-Apr. 2004, doi: 10.1109/MDT.2004.1277900.

(Continued)

*Primary Examiner* — Anibal Riveracruz
(74) *Attorney, Agent, or Firm* — Stosch Sabo

(57) ABSTRACT

A computer system, computer readable storage medium, and computer-implemented method for retrograding an instruction stream to enhance random test generation. The method includes generating a test case for a design-under-test (DUT) comprising positioning one or more placeholder instructions in the test case. The method also includes identifying one or more benefiting instructions. The method further includes executing the test case by replacing the one or more placeholder instructions with one or more respective retrograding instructions. The one or more retrograding instructions influence the one or more benefiting instructions.

20 Claims, 11 Drawing Sheets

(56) References Cited

U.S. PATENT DOCUMENTS

| | | | |
|---|---|---|---|
| 9,032,373 B1* | 5/2015 | Gupta | G06F 11/3688 |
| | | | 717/127 |
| 9,432,298 B1* | 8/2016 | Smith | H04L 49/9057 |
| 9,582,320 B2 | 2/2017 | Holt | |
| 2009/0319252 A1* | 12/2009 | De | G06F 30/3323 |
| | | | 703/14 |
| 2012/0131386 A1* | 5/2012 | Fournier | G06F 11/263 |
| | | | 714/35 |
| 2015/0221396 A1* | 8/2015 | Subramaniam | G06F 11/2242 |
| | | | 714/720 |
| 2019/0042433 A1 | 2/2019 | Porpodas | |
| 2020/0201747 A1 | 6/2020 | Duale | |

OTHER PUBLICATIONS

A. Adir, R. Emek and E. Marcus, "Adaptive test program generation: planning for the unplanned," Seventh IEEE International High-Level Design Validation and Test Workshop, 2002., Cannes, France, 2002, pp. 83-88, doi: 10.1109/HLDVT.2002.1224433.
Power ISA 3.1. May 1, 2020 (IBM Corporation) United States. https://wiki.raptorcs.com/w/images/f/f5/PowerISA_public.v3.1.pdf <Retrieved Mar. 30, 2023> (PDF document broken into Parts 1-5).
Y. Katz, M. Rimon and A. Ziv, "Generating instruction streams using abstract CSP," 2012 Design, Automation & Test in Europe Conference & Exhibition (DATE), Dresden, Germany, 2012, pp. 15-20, doi: 10.1109/DATE.2012.6176425.

* cited by examiner

INSTRUCTION STREAM RETROGRADING TO ENHANCE RANDOM TEST GENERATION

BACKGROUND

The present disclosure relates generally to data processing, and, more specifically, toward enhancing random test generation for verification of hardware designs.

Many known test generation systems and methods are employed to execute verification testing of designs of electronic devices, including processing devices. In some instances, the testing includes pre-silicon verification testing such that confidence in the design of the device is established prior to physically constructing the device. Randomization of the respective testing instructions is frequently used to make the testing environment more robust.

SUMMARY

A system, medium, and method are provided for retrograding an instruction stream to enhance random test generation.

In one aspect, a computer system for retrograding an instruction stream to enhance random test generation is presented. The system includes a random test generation system configured to generate a test case for a design-under-test (DUT). The random test generation system is configured to position one or more placeholder instructions in the test case. The random test generation system is also configured to identify one or more benefiting instructions. The random test generation system is further configured to execute the test case, including a replacement of the one or more placeholder instructions into one or more respective retrograding instructions. The one or more retrograding instructions influence the one or more benefiting instructions.

In another aspect, a computer readable storage medium is presented. The computer readable storage medium includes computer executable instructions that when executed by at least one computing device retrograde an instruction stream to enhance random test generation. The computer readable storage medium includes instructions to generate a test case for a design-under-test (DUT). The computer readable storage medium also includes instructions to position one or more placeholder instructions in the test case. The computer readable storage medium further includes instructions to identify one or more benefiting instructions. The computer readable storage medium also includes instructions to execute the test case, including replacing the one or more placeholder instructions into one or more retrograding instructions. The one or more retrograding instructions influence the one or more benefiting instructions.

In yet another aspect, a computer-implemented method for retrograding an instruction stream to enhance random test generation is presented. The method includes generating a test case for a design-under-test (DUT) comprising positioning one or more placeholder instructions in the test case. The method also includes identifying one or more benefiting instructions. The method further includes executing the test case, including replacing the one or more placeholder instructions into one or more respective retrograding instructions. The one or more retrograding instructions influence the one or more benefiting instructions.

The present Summary is not intended to illustrate each aspect of every implementation and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
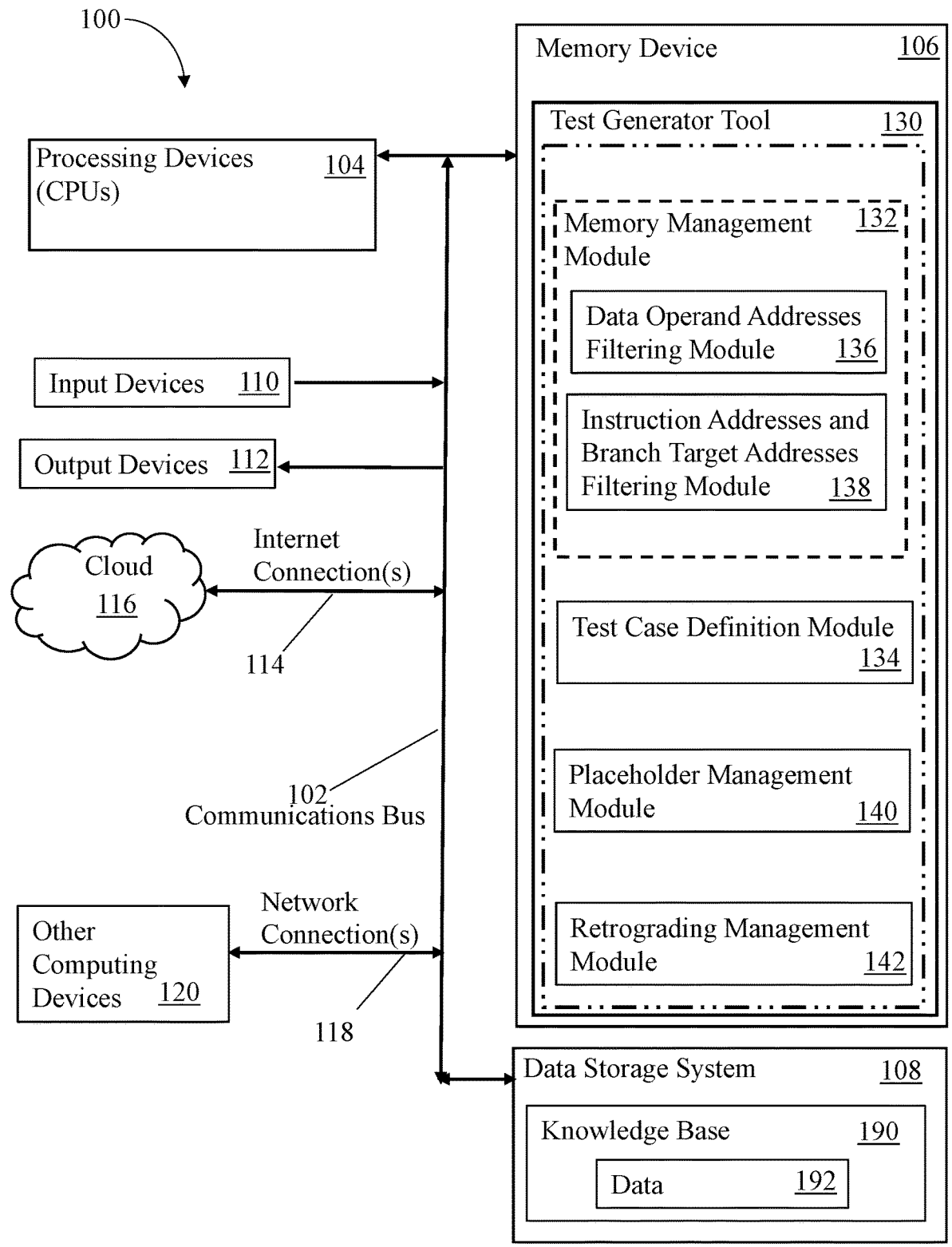
FIG. 1 is a block diagram illustrating a computer system configured to execute operations associated with retrograding an instruction stream to enhance random test generation, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a system, medium, and method for retrograding a verification test instruction stream to enhance random test generation for a software version of a hardware design. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer readable storage medium of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As used herein, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Many known test generation systems and methods are employed to execute verification testing of electronic devices, including processing devices. In at least some such verification testing, simulation-based testing is employed. In some instances, the simulation-based testing includes pre-silicon verification testing though constrained random test generation for verification of the hardware designs for the designs-under-test (DUTs). Examples of DUTs often subject to such software verification are processors, and microarchitectural features of microprocessors. The verification execution is often performed through a software-based model of the DUT. The test definitions are typically produced by engineers to exercise specific architectural and micro-architectural features of the microprocessor. In general, the pre-silicon verification testing is executed such that confidence in the design and functionality of the device is established prior to physically constructing any physical versions of the device. For example, the functional verification of the design includes the use of instructions to undergo the respective computing processes to verify the computed instructions are performed satisfactorily. Regardless of the nature of the testing, randomization of the respective testing instructions is frequently used to make the testing environment more robust. Many of the known random test generation systems generate the respective instruction streams according to an execution order that is implied from the respective architecture of the DUT.

Referring to FIG. 1, a block diagram is presented illustrating a computer system, i.e., a random test generation system 100 (herein referred to as "the system 100") configured to execute operations associated with retrograding an instruction stream to enhance random test generation, in accordance with some embodiments of the present disclosure. In at least some embodiments, the system 100 is principally configured for verification testing of software-based hardware designs of electronic devices prior to any physical implementation of the designs. The system 100 includes the one or more processing devices 104 (only one shown) communicatively and operably coupled to one or more memory devices 106 (only one shown) through a communications bus 102, and in some embodiments, through a memory bus (not shown). In some embodiments, each processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data 192 to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 8), e.g., and without limitation, the system 100 is a computer system/server that may be used as a portion of a cloud-based systems and communications environment through the cloud 116 and the Internet connections 114.

In one or more embodiments, a test generator tool 130 (herein referred to as "the tool 130") is at least partially resident within the memory device 106. In some embodiments, the test generator tool 130 is fully resident within the memory device 106. The tool 130 is discussed in detail further in this disclosure. The tool 130 is configured to execute the actions necessary for stream-based verification test generation, and, more specifically, toward retrograding an instruction stream to enhance random verification test generation. In some embodiments, the aforementioned processing devices include the one or more processing devices 104. In at least some embodiments, the tool 130 resident in the memory device 106 is configured to run continuously in the background to automatically execute the stream-based random test generation processes. In some embodiments, the tool 130 is directly engaged for specific tasking by the users thereof, e.g., and without limitation, manual execution commands. In some embodiments, the tool 130 uses one or more test templates to direct the test generation process.

In at least some embodiments, as shown in FIG. 1, the tool 130 includes the modules for the processes described herein. The tool 130 includes a memory management module 132 configured to maintain tracking of storage addresses used in the constrained random test generation and making the addresses available to a test case definition module 134. The memory management module 132 and the test case definition module 134 facilitate storage of addresses used in the past to be accessed by the current instruction generation without having to deliberately establish target addresses first. The test case definition module 134 facilitates separate test events to interact with the same storage addresses in the memory management module 132 without having to write a special test.

In one or more embodiments, the tool 130 maintains an internal record of memory addresses for instructions, branch targets and data operands with the memory management module 132, which is used as the tool 130 generates instructions and maintains a record of these addresses along with various attributes. These addresses stored in the memory management module 132 are then accessible to the test case definition module 134 through built in expression functions. Addresses can be grouped together by proximity in ways that are meaningful to the microprocessor's hardware microarchitecture. Addresses can be retrieved using several other criteria, such as which microprocessor used the address, an address that is most commonly used, the address that was used last, or second last, and the like.

The memory management module 132 stores data operand addresses with predefined filtering parameters resident within a data operand addresses filtering module 136. The memory management module 132 also stores instructions' addresses and branch targets' addresses with predefined parameters resident within an instruction addresses and branch target addresses filtering module 138 with predefined parameters.

In at least some embodiments, the tool 130 includes a placeholder management module 140 that is configured to manage the generation of the respective placeholders into the verification test stream, including, without limitation, the size and type of placeholder operation, to facilitate subsequent retrograding operations. In addition, in some embodiments, the tool 130 includes a retrograding management module 142 that is configured to manage the operations associated with the retrograding of the instructions as described further herein to enable modification of the placeholders to facilitate operations directed toward the testing subject.

Further, in some embodiments, the data storage system 108 is configured to maintain a knowledge base 190 that includes any data 192 the tool 130 needs for proper redundancy verification execution. The data storage system 108 is also configured to store the data collected during the messaging and waveform analyses as executed by the modules 132 and 134, respectively.

Figure 2A:
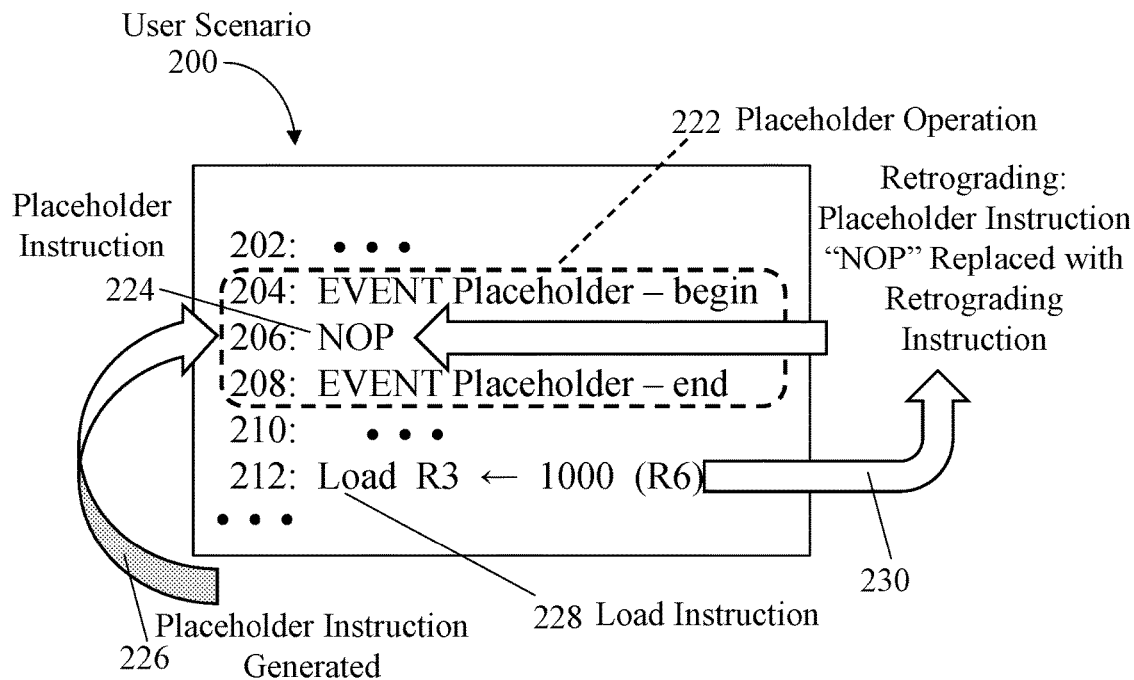
FIG. 2A is a block diagram illustrating a portion of a user scenario used with a random test generation process that may be executed on the computer system of FIG. 1, in accordance with some embodiments of the present disclosure.

Referring to FIG. 2A, a block diagram is presented illustrating a portion of a user scenario 200 associated with a random test generation process that may be executed by the system 100 of FIG. 1, in accordance with some embodiments of the present disclosure. The user scenario 200 is a prefetching scenario; however, the prefetching operations as described herein are non-limiting. Prior to the actual verification testing process being performed, an offline modeling stage includes configuring a model that will be used during such testing. In general, one or more users, e.g., including knowledgeable engineers, define potential testing embodiments that they are interested in seeing executed on the design-under-test (DUT) with the determined constraints such that the model will exercise the respective benefiting instructions (discussed further herein) once the verification testing is initiated. Also, in general, for the modeling stage, the model is defined once and the model remains substantially static for the sequences of DUT verification testing. More specifically, the model will be accessed many times while accessing the various load instructions (discussed further herein) for each exercise.

A first component of the retrograde instruction seeding methods (herein referred to as "the retrograding") includes identifying a set of placeholder instructions for generation for a verification test generation stream when the conditions in the test generation process allow such generation. In at least some embodiments, as shown in FIG. 2A, an initial instruction line 202 is presented with an ellipses to indicate that the following instruction lines are embedded within the verification code.

At least one component of the retrograding disclosed herein includes generating one or more placeholder instructions. In at least some embodiments, the instruction line 204 is "EVENT Placeholder-begin" that initiates a placeholder operation 222 that is a portion of the retrograding process. In some embodiments, the placeholder instructions are generated through the placeholder management module 140 (see FIG. 1).

In one or more embodiments, a following instruction line 206 is a placeholder instruction 224 that is generated 226 for the user scenario 200. In one or more embodiments, prior to the generation 226, the characteristics of the placeholder instruction 224 are identified. In some embodiments, with respect to identifying the characteristics, the selected placeholder instruction 224 is a no-operation (NOP) instruction. In general, a "NOP instruction" results in a machine language (or assembly language) instruction that does not change the state of the processor. In the present instance of the NOP instruction, the memory is not accessed and the placeholder instruction 224 is established that will be replaced by instructions later on during the retrograding. The placeholder instructions 224 are agnostic to the user scenarios and are configured to facilitate the retrograding process, where the retrograding instructions mesh into the user scenarios when the respective retrogrades take place. In this way, an existing scenario that is designed to target some specific verification requirement will also target other verification aspects without any modification to the original scenario.

In at least some embodiments, the next instruction line 208 is "EVENT Placeholder-end" that ends the placeholder operation 222. Upon completion of the placeholder operation 222, any instruction lines 210 may be placed into the user scenario as at least partially defined by the user scenario 200.

In some embodiments, the last instruction line 212 for the portion of the user scenario 200 includes a load instruction 228 "Load R3←1000 (R6)" that accesses the memory address obtained by adding the content of the register R6 to the constant displacement value of "1000," where the register R6 and the value 1000 are non-limiting. The load instruction 228 of the instruction line 212 identifies the memory address defined by the operation (R6+1000) and loads that memory address into the register R3. This memory address will later be accessed to prefetch the data access made by the benefiting instruction (discussed further below) at the identified memory address through the corresponding retrograding instruction. Such retrograding instruction will occupy the same memory address where the placeholder instruction is resident, thereby replacing its contents. In some embodiments, the load instruction 228 first identifies its own properties, takes the existing predetermined constraints previously identified in the modeling phase as described above, manifests such constraints (i.e., makes such constraints come true), and then the retrograding instruction is generated once the respective load instruction is generated. In some embodiments, the load address, the address of the retrograding instruction, and the address of the benefiting instruction can be determined in any order as long as the constraints that must hold between them are satisfied. Accordingly, the retrograding instruction that will replace the placeholder instruction 224, and the respective memory access of the retrograding instruction, are identified. In some embodiments, the operations associated with the instruction line 212 are executed through the retrograding management module 142 (see FIG. 1).

The retrograding described herein (as managed through the retrograding management module 142) further includes detecting, in the instruction set architecture of the design-under-test (DUT), those instruction/resource accesses that can benefit from retrograding the respective one or more placeholder instructions 224. The instructions that benefit are referred to as "benefiting instructions." The test generation tool 130 detects one or more benefiting instructions, i.e., instructions that can benefit from several types of retrograding instructions, and applies respective rules to the selected instructions. As previously described, the benefiting instructions have already been predetermined and identified. In some embodiments, the memory access made by the benefiting instruction is identified such that it may be prefetched. In some embodiments, the user identifies the benefiting instructions. In some embodiments, the pairing of a benefiting instruction with a placeholder instruction is done contemporaneously with identifying the placeholder instruction 224. In some embodiments, the user can control this mechanism with a set of directives to facilitate the placeholder instructions 224 to be inserted only in scenarios that have a high probability of generating benefiting instructions to augment the verification. In some embodiments, the users can control the type of placeholder instructions, the rate of generating the placeholder instructions for the scenario, and the allowed lengths of the retrograding instructions.

Therefore, in one or more embodiments, during the test generation process, if such benefiting instructions are detected and the respective placeholders exist, the retrograding mechanism as described herein is triggered to determine the retrograding instructions to use to enhance the identified benefiting instructions prior to execution of the benefiting instructions. Accordingly, the generation stage of the benefiting and retrograding instructions is completed.

In general, the determination and generation of each retrograding instruction is performed in two phases. The first phase includes determining the memory location of the retrograding instruction, an action that is executed when the placeholder instruction is generated (as previously described). The second phase includes determining the identity and operands of the retrograding instruction by the respective benefiting instruction (that has been identified and detected as previously described). As such, the respective benefiting instruction initiates the retrograding operation as described further herein. The process of determining the retrograding operation is initiated simultaneously with the generation of the load instruction 228.

In addition, the respective retrograding instructions are not the result of a random or arbitrary selection, rather, the selected retrograding instructions include features and properties that are determined to enhance the respective benefiting instructions, i.e., the retrograding instructions are determinatively selected to have a desired effect on the respective benefiting instruction. Moreover, in at least some embodiments, the user also has control over the rate of each type of retrograding action when more than one retrograding action is a potential candidate for a given placeholder instruction, including not applying any retrograding actions. Furthermore, in some embodiments, the same benefiting instruction can influence more than one retrograding instruction. Accordingly, the desired interaction is maintained between the benefiting instruction and the retrograding instruction without violating the validity requirements of the resulting verification test.

Figure 2B:
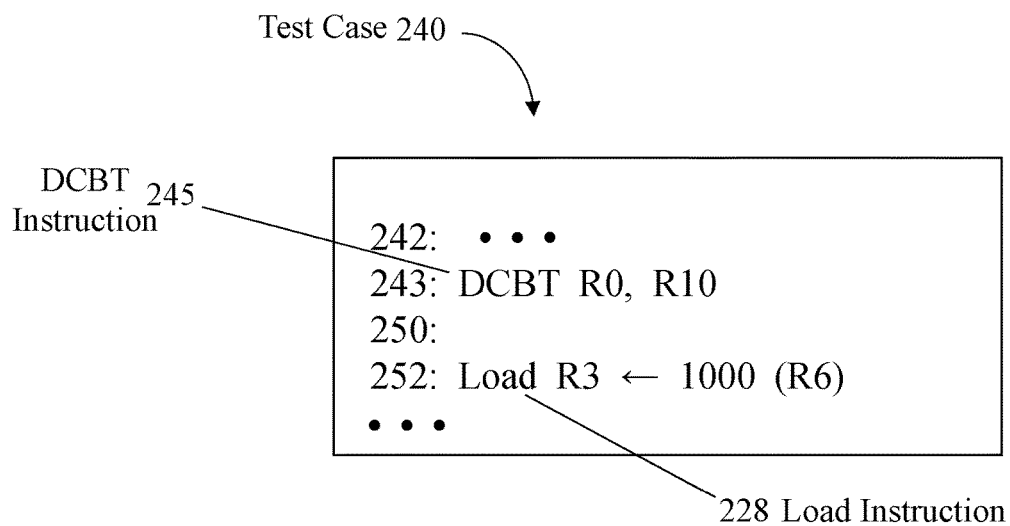
FIG. 2B is a block diagram illustrating a portion of a test case at least partially resulting from the user scenario of FIG. 2A, in accordance with some embodiments of the present disclosure.

Referring to FIG. 2B, a block diagram is presented illustrating a portion of a test case 240 at least partially resulting from the user scenario of FIG. 2A (also continuing to be referenced), in accordance with some embodiments of the present disclosure. Continuing, and referring back to, the component numbering scheme of FIG. 2A, in FIG. 2B the instruction line 242 of the test case 240 corresponds to the instruction line 202 of the user scenario 200. The test case 240 is generated though the user scenario 200 and is executed as further described.

In one or more embodiments, the pending retrograding instruction that will replace the placeholder instruction 224 is a cache hint instruction that facilitates identifying the memory access of the benefiting instruction. In the present embodiments described for FIGS. 2A and 2B, the cache hint instruction is a Data Cache Block Touch instruction (herein referred as a "DCBT instruction"). The employment of a DCBT instruction is non-limiting, and any instruction that enables operation of the system 100 as described herein can be used as the cache hint instruction. As used herein, the term "cache hint instructions" refers to instructions that are one type of retrograding instructions that predict or influence the behavior of other instructions. For example, and without limitation, one use for cache hint instructions is when a microprocessor design includes an architectural definition that uses such instructions to hint to the DUT that a memory address, or set of addresses, are likely to be accessed in the near-term. Such cache hint instructions facilitate decreasing processing latencies through bringing data into cache from a more distant memory location. Such cache hint instructions are verified in the designs-under-test prior to incorporation in a physical version of the respective designs. In some embodiments, cache hint instructions may also be used for instances and conditions outside of, and/or in addition to the retrograding operations described herein, as well as with any type of retrograding instructions not expressly described herein. As such, the cache hint instruction can be one of several retrograding instructions employed by the same benefiting instruction.

In at least some embodiments, an instruction line 243 holds a retrograding instruction resident therein, specifically, a DCBT instruction 245, i.e., "DCBT R0 R10," where the respective registers R0 and R10 (in a non-limiting manner) are chosen as the operands of the DCBT instruction 245 that the DCBT instruction 245 replaces (i.e., retrogrades 230). Therefore, the placeholder instruction 224, i.e. the NOP instruction of the instruction line 206, is replaced through the retrograding 230. A restriction on the registers R0 and R10 is that they satisfy the constraint: the memory address denoted by R0+R10 resides in the same cache line as the address accessed by the load instruction 228.

As used herein, a "cache line" is a chunk of memory that is handled by the cache, where, in general, cache line sizes include 32 bytes, 64 bytes, and 128 bytes. The respective cache is configured to hold a limited number of cache lines therein as determined by the cache size. The allocation of the cache space is typically managed by the processor such that contents of the accessed memory address are loaded into the cache in anticipation of near-term use. Accordingly, the prefetched data as described herein is placed into the designated cache as a cache line.

It is noted that the example choice of the register R0 as one of the operands in the operation including the registers R0 and R10 serves to simplify the problem of satisfying the aforementioned restriction. More specifically, it takes advantage of one or more architectural rules that specify that the calculation ignores the value of the register R0 and uses a value of 0 in its stead. Such selection simplifies the equation such that the address accessed by the load instruction immediately implies the required value for the register R10. The instruction line 252 of the test case 240 corresponds to the instruction line 212 of the user scenario 200.

Here, in the present embodiment, the test generation tool 130, and more specifically, the test case definition module 134 and the retrograding management module 142 (all shown in FIG. 1) executes the load instruction 228 of instruction line 252 through retrograding 230 the NOP placeholder instruction 224 with the respective DCBT instruction 245 that accesses the memory address as identified through the load instruction 228.

In some embodiments, once the load instruction 228 of instruction line 212/252 is generated, if there were several previous NOP insertions that could be chosen, then the test generation tool 130, and more specifically, the test case definition module 134, and in some embodiments, the retrograding management module 142, could pick the previous NOP insertion that would optimize the portion of the user scenario 200 that was triggered. In the instance of the DCBT instruction 245, picking the NOP instruction that is further back in time, as opposed to an NOP instruction that was only a few instructions before the load instruction 228 of instruction lines 212/252, would be beneficial as it would allow the DUT more time to get the data specified by the DCBT instruction 245 into the respective cache so that it is available when the load instruction, i.e., the DCBT instruction 245 executes.

Accordingly, in one or more embodiments, another component of the retrograding 230 includes replacing the placeholder instructions 224 with the retrograding instructions, i.e., the DCBT instructions 245. In some embodiments, at least a portion of the placeholder instructions 224 are partially formed retrograde instructions, where, in such cases, the retrograde process 230 replaces the portion of the placeholder instructions that are not partially formed, and the retrograde process 230 only modifies the partially formed retrograde instructions into fully formed retrograde instructions rather than fully replacing them.

In some embodiments, the size of the placeholder instruction 224 determines the size of the retrograding instructions that can be used for the retrograding 230. For example, and without limitation, in those embodiments where the size of the placeholder instruction 224 is 4 bytes, then the replacement DCBT instruction 245 cannot exceed 4 bytes. To overcome this limitation, in some embodiments, where the placeholder instruction 224 and the potential retrograding instruction are of different lengths, a plurality of adjacent placeholder instructions 224 are automatically generated for the user scenario 200 through the test generation tool 130. In general, the placeholder space is split among one or more retrograding instructions. Here, more specifically, the adjacent placeholder instructions 224 are subsequently replaced with one retrograding instruction automatically through the test generation tool 130. For example, and without limitation, if a single placeholder instruction 224 is 4 bytes in length, and the retrograding instructions are 8 bytes in length, then two adjacent placeholder instructions are generated for the user scenario 200.

Figure 2C:
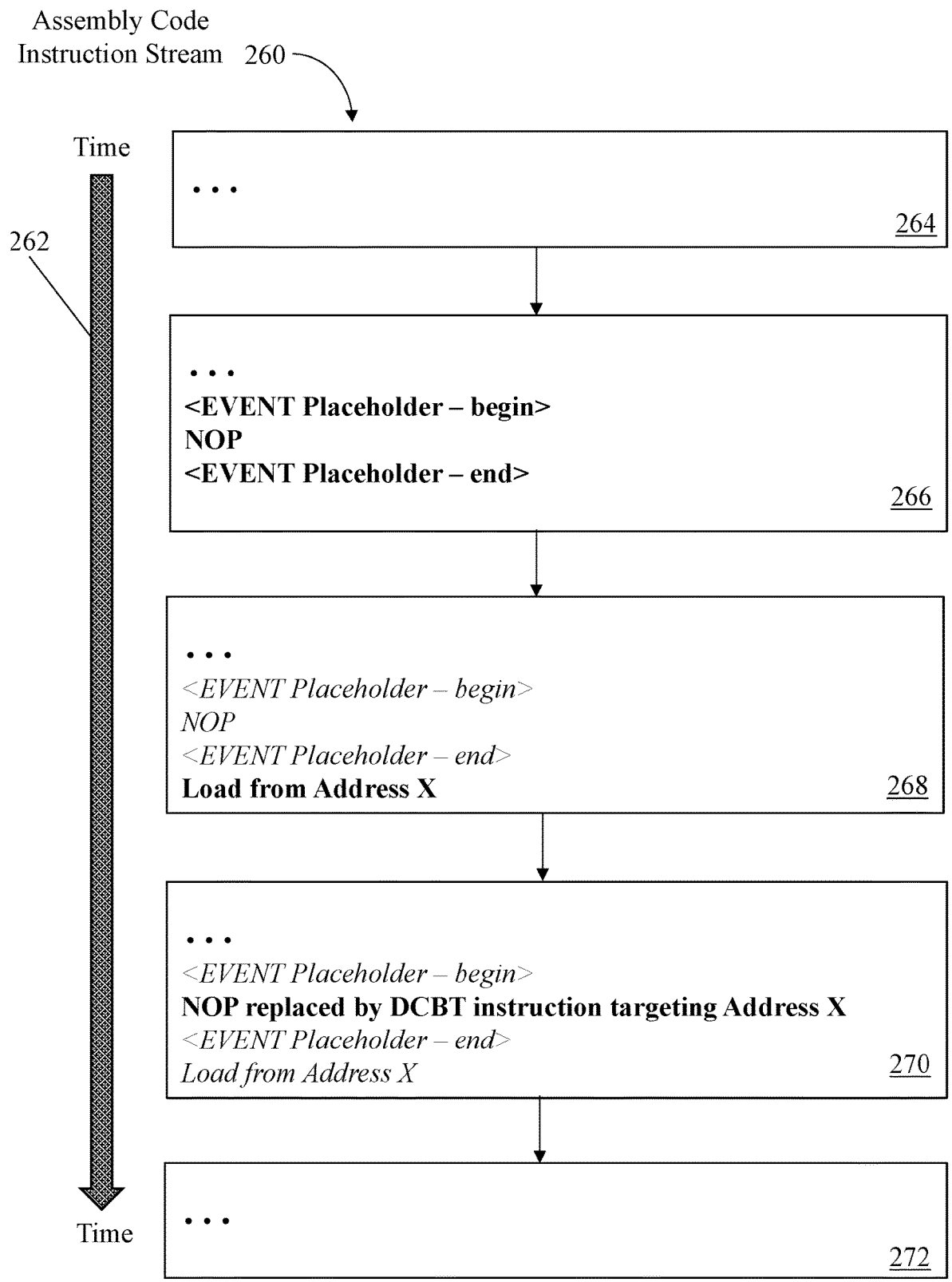
FIG. 2C is a block diagram illustrating a portion of an assembly code instruction stream at least partially based on the user scenario of FIG. 2A and the test case of FIG. 2B, in accordance with some embodiments of the present disclosure.

Referring FIG. 2C, a block diagram is presented illustrating a portion of an assembly code instruction stream 260 that is at least partially based on the user scenario 200 of FIG. 2A and the test case 240 of FIG. 2B, in accordance with some embodiments of the present disclosure. Also, continuing to refer to FIGS. 2A and 2B, a time axis 262 extends in the forward direction from the top to the bottom of FIG. 2C. By the point of the block 264 in the assembly code instruction stream 260 for the present verification test generation process, the steps including execution of the portion of the retrograding including identifying the set of placeholder instructions for the stream 260, generating the set of placeholder instructions, and detecting those respective benefiting instructions, are completed. Subsequent to block 264, the retrograding also includes block 266 that includes generating 226 the placeholder instructions 224 for the test stream as indicated in the user scenario 200 through the placeholder operation 222 at instruction lines 204, 206, and 208, such that the NOP placeholder instruction 224 is resident in the assembly code instruction stream 260. In block 268, the previous instructions of block 266 that are bolded therein are italicized and the loading instruction from instruction lines 212/252 (bolded in block 266, and generalized with respect to where the load is being accessed) is resident within the assembly code instruction stream 260. In block 270, the NOP placeholder instruction 224 is replaced, i.e., retrograded by the DCBT instruction 245 targeting the generalized address X where the benefiting instruction resides. In the discussion above, that generalized cache address is specifically identified as the register R10. The assembly code instruction stream 260 proceeds to block 262 and the remainder of the user scenario 200 is generated. As indicated by block 272, the verification process associated with the assembly code instruction stream 260 proceeds to the remaining verification tasks.

In general, there is a requirement for simulation-based DUT verification systems to satisfy an existing user's scenario restrictions (constraints) on the retrograding instruction. The execution of the respective retrograding instructions that replace the placeholder instructions should not result in an exception or processor state change for any instruction that comes between the retrograding instruction and the benefiting instruction.

In addition, the placeholding and retrograding instructions do not have any architectural effects on the interval of instructions that precede the benefiting instructions; however, the retrograding instruction may have an architectural effect on the respective benefiting instruction itself. If the retrograding instruction affects an architectural aspect of the DUT, these effects should be broadcast to any module responsible for predicting the architectural state of the DUT following the execution of the respective benefiting instruction. However, as briefly described above, the benefiting instruction itself can change its architectural behavior as a result of the respective retrograding. Therefore the retrograding instructions will not facilitate any issues associated with validity.

Moreover, when the benefiting instruction is generated, it determines the identity and operands of the retrograding instruction. Only registers that can be initialized/reloaded with a new value are selected, and the new value is chosen such that it satisfies the restrictions on the retrograding instruction. If an affected register was never used prior, the operation will set its initial value. Otherwise, the previous operation will set the reloaded value as described. In order to keep the validity requirement, the registers must have been reloaded prior to generating the place-holder instruction. More specifically, when assigning data to the registers of the retrograding instruction, the respective benefiting instruction must ensure that these registers are either uninitialized or reloaded.

All processors, including their virtual designs, contain bounded registers which are limited in the number of elements these resources contain. Since these registers are bounded, they become initialized usually after generating only a few instructions in the test. Once a resource is initialized, its value is determined solely by instructions which modify it. The generation of any subsequent instruction therefore becomes very limited since the selection of data for these registers is restricted to their current values. These restricted values often cause failures of the part of the constraints on any new instruction generation. The result is that either the instruction generation will fail or that the generated instruction will not achieve its intended verification value. Accordingly, the registers must be either uninitialized or reloaded as further described.

As used herein, the term "reloading" is defined as a technique for making initialized resources, e.g., registers, to act as if they are uninitialized. In general, the process of generating an instruction in a verification test consists of selecting particular registers needed by the instruction and then selecting and initializing the contents of these registers. The verification value of a test is in its ability to check many different aspects of the design and is very much dependent on the smart selection of data for the selected resources of each instruction.

When a new instruction is generated, such resources are available, if the data that the instruction determines for the resource matches the value already in the resource then the generation of the instruction can proceed successfully using this resource. However, if the generation process requires certain values that are not currently available in any of the initialized resources, the instruction can use a reloaded resource and reinitialize its value instead. By using the reloading technique, test generators can continue generating instructions with special data in their resources, even in extended tests. Resource reloading utilizes the fact that memory is practically an unlimited resource that can be used to compensate for the scarcity of other resources such as registers, IO, etc. Typically, the reloaded resource is a register, while the resource through which reloading is achieved is memory.

The resource reloading is based on a sequence of instructions (which transfers a new value from the memory to the reloaded resource. This new value is a function of the initialization value of the memory resource, where the function to reload the respective resource from the memory is a mapping function such that after generation of each reloading sequence, the reloaded resource, the memory location, and the map function are saved. When generating instructions following a reloading sequence, the test generator has complete freedom to select new values for the reloaded resources just as if they had not been initialized previously in the test. Once the value for the reloaded resource is determined, it becomes the current value of the reloaded resource, and the initial value of the memory is changed according to the map function. This new initial value replaces the previous initial value of the memory which was set when the reloading sequence was originally generated. It is required that the value of the memory can be replaced by a subsequent instruction without producing any changes in the values of any other resources besides the memory and the reloaded resources. Using the memory before a reloaded resource may affect the contents of other resources when the initial value of the memory is replaced. When using the reloaded resource these effects, as well as the effect on the memory contents need to be considered. In some embodiments, the reloaded register is referred to the resource which is emulated to be uninitialized.

In some embodiments, a reloading sequence can reload a part of the reloaded resource. Alternatively a series of reloading sequences can map different parts of the reloaded resource into different memory locations using a different map function for each one. In addition, in some embodiments, the usage of reloaded resources does not have to immediately succeed the reloading.

As previously described, the benefiting instruction is the instruction that controls the generation of the retrograding instruction. Its location in memory was defined by the chosen placeholder for this operation. For example, in the DCBT retrograding embodiments, this ensures a required minimal distance between the cache hint instruction (the DCBT instruction) and the actual load (the benefiting instruction) data that has been prefetched from the accessed memory address into the respective cache line. As used herein, the term "distance" with respect to instructions refers to the number of instructions between the retrograding instruction (e.g., a DCBT instruction) and the benefiting instruction. In general, it is desired to minimize the distance between the two instructions. Verification of such cache hint instructions is often difficult to achieve and frequently results in an incomplete state space examination of the DUT. Such cache hint instructions include, for example, providing data prefetch hint instructions, instruction prefetch hint instructions, and branch predictions. For example, one limitation of exclusively stream-based test generation is that it does not scale to large sequences of instructions, and hence cannot be used for either of the aforementioned prefetch verifications or the branch predictions, where the distance between the hint instruction and the future benefiting instruction that performs the predicted access can be quite large. In some instances of known systems, a user-directed instruction sequencing approach does provide a basic level of verification for the execution of the prefetch mechanism; however, this approach does not provide an adequate level of coverage of all possible bug scenarios principally due to the inability through the known systems to easily insert generic meaningful prefetch sequences into existing or new test verification test templates.

In some embodiments, where the placeholder instructions 224 are inserted into the verification test stream, however, no benefiting instructions are identified, the system 100 will apply other rules and replace the placeholder instructions with some intelligent behavior. More specifically, in some embodiments, where the verification test generation is completed with one or more placeholder instructions not being replaced with the respective retrograding instructions, the user will control the verification behavior of the test generation tool 130. For example, if the test generator tool 130 detects a benefiting instruction, and there are pending requests for a retrograde, at least some of the remaining placeholders are replaced with other instructions that at least partially match the requirements of the benefiting instruction. These other instructions modify the microarchitectural behavior of the test without affecting its architectural validity, such as various synchronization instructions (e.g. sync, isync, etc.). Such mechanisms facilitate generating multiple tests for the same scenario with one or more additional verification testing dimensions that differ from each other to enhance the user's efforts directed toward the quality of the respective verifications.

In one or more embodiments, once the verification testing is executing for the DUT, the access of the address for the prefetch is attained and the respective benefiting instruction's data is prefetched from the accessed memory location as a prefetched cache line and is loaded into the determined cache. Such actions are typically executed by the DUT.

Figure 2D:
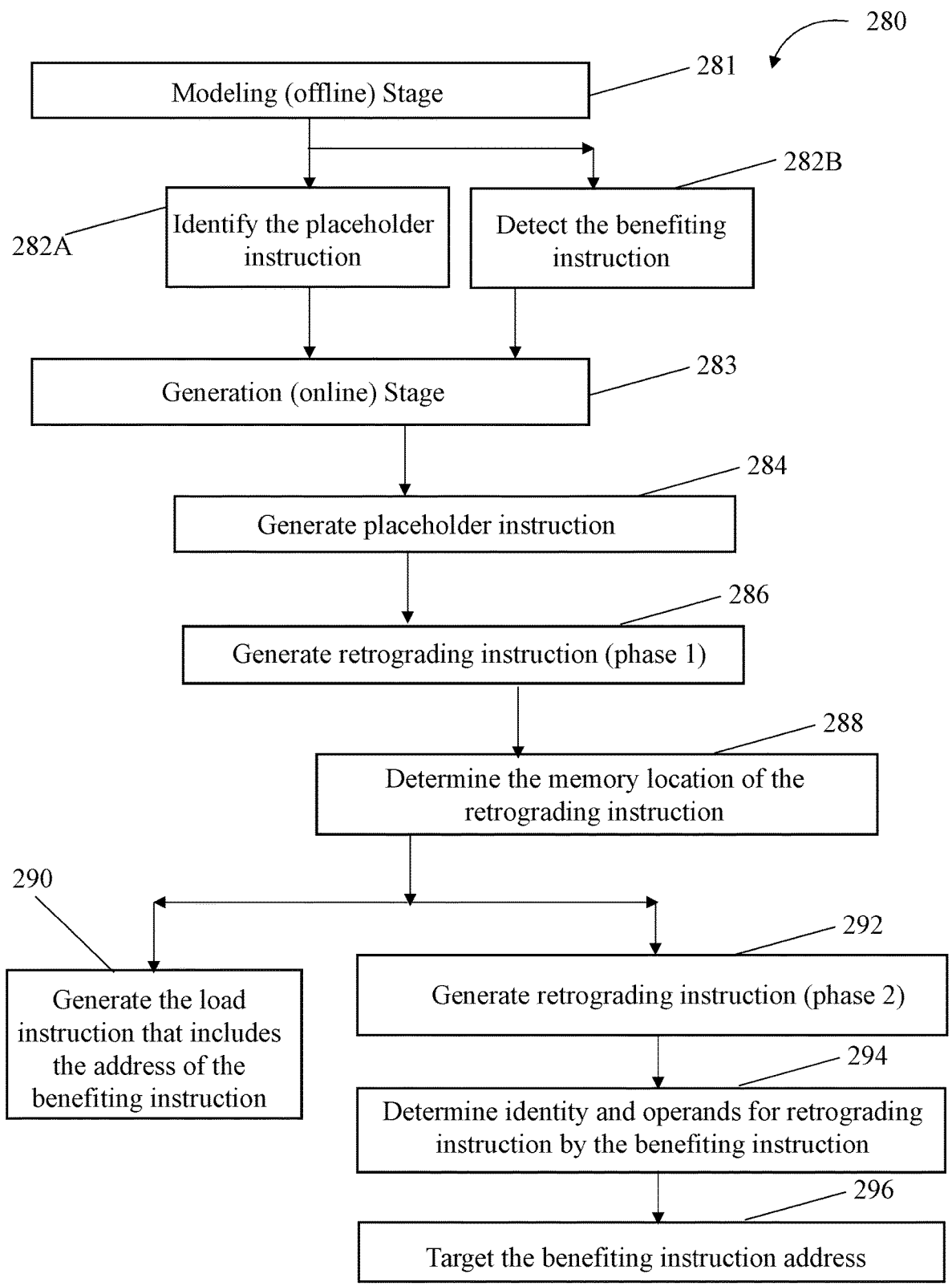
FIG. 2D is a block diagram illustrating a process for retrograding within the random test generation process of FIGS. 2A, 2B, and 2C, in accordance with some embodiments of the present disclosure.

Referring to FIG. 2D, a block diagram illustrating a process 280 for retrograding within the random test generation process of FIGS. 2A, 2B, and 2C is presented, in accordance with some embodiments of the present disclosure. Continuing to refer to FIGS. 2A-2C, prior to the actual verification testing process being performed, an offline modeling stage 281 includes configuring a model to facilitate the test generation of pre-identified embodiments through user defined potential testing embodiments that the users are interested in seeing executed on the design-under-test (DUT) with the determined constraints such that the model will exercise the respective benefiting instructions once the verification testing is initiated. The modeling stage is executed once and the model is substantially static for the sequences of DUT verification testing.

In some embodiments, the process 280 includes identifying 282A the placeholder instruction 224. In some embodiments, the user can control this mechanism with a set of directives to facilitate the placeholder instructions 224 to be inserted only in scenarios that have a high probability of generating benefiting instructions to augment the verification. In some embodiments, the users can control the type of placeholder instructions, the rate of generating the placeholder instructions into the scenario, and the allowed lengths of the retrograding instructions. In one or more embodiments, identifying the placeholder instruction and detecting the respective benefiting instruction are executed simultaneously.

In some embodiments, the detection 282B of the benefiting instruction is executed contemporaneously with identifying 282A the placeholder instruction 224. Such detecting 282B is facilitated through the instruction set architecture of the design-under-test (DUT) such that those instruction/resource accesses that can benefit from retrograding the respective one or more placeholder instructions 224 are known, including their memory addresses, where the respective rules are applied to the selected benefiting instructions. In some embodiments, the memory address of the benefiting instruction that will be accessed is identified such that the benefiting instruction may be prefetched. In some embodiments, the user identifies the benefiting instructions. Therefore, in one or more embodiments, during the test generation process, if such benefiting instructions are detected and the respective placeholders exist, the retrograding mechanism as described herein is triggered to determine the retrograding instructions to be uses in order to enhance the identified benefiting instructions prior to execution of the benefiting instructions.

In at least some embodiments, for the process 280, a generation stage 283 is implemented, where the generation stage 283 is executed while the verification testing process is online. The generation stage 283 includes generating 284 the respective placeholder instruction 224. In one or more embodiments, the placeholder instruction 224 that is generated 284 (226 in FIG. 2A) for the user scenario 200. In one or more embodiments, prior to the generation 284, the characteristics of the placeholder instruction 224 are identified. In some embodiments, the selected placeholder instruction 224 is a no-operation (NOP) instruction. Accordingly, the placeholder instruction 224 that will be replaced by instructions later on during the retrograding is established.

In at least some embodiments, the determination and generation of each retrograding instruction is performed in two phases. The first phase (phase 1) 286 of the generating of the retrograding instruction includes determining 288 the memory location of the retrograding instruction as an action that is executed when the placeholder instruction 224 is generated 284.

In one or more embodiments, the process 280 includes generating 290 the load instruction 228 that includes the address of the benefiting instruction. Specifically, the last instruction line 212 for the portion of the user scenario 200 includes a load instruction 228 "Load R3←1000 (R6)" that accesses the memory address obtained by adding the content of the register R6 to the constant displacement value of "1000," where the register R6 and the value 1000 are non-limiting. The load instruction 228 of the instruction line 212 identifies the memory address defined by the operation (R6+1000) and loads that memory address into the register R3. This memory address will be accessed when the test is simulated to prefetch the data access made by the benefiting instruction at the identified memory address through the corresponding retrograding instruction. Such retrograding instruction will occupy the same memory address where the placeholder instruction 224 is resident, thereby replacing its contents. The load instruction 228 first identifies its own properties, takes the existing predetermined constraints previously identified in the modeling phase as described above, manifests such constraints (i.e., makes such constraints come true), and then the retrograding instruction is generated once the respective load instruction is generated. Accordingly, the retrograding instruction that will replace the placeholder instruction 224, and the respective memory access of the retrograding instruction, are identified.

In some embodiments the second phase (phase 2) 292 of generating the retrograding instruction is executed within the process 280, including determining, through the benefiting instruction, the identity and operands for the retrograding instruction. Moreover, in some embodiments, phase 2

292 of generating the retrograding instruction includes targeting 296 the benefiting instruction address. As such, the respective benefiting instruction initiates the retrograding operation. The process of determining the operands and the initiation of the retrograding operation is performed simultaneously with the generation 290 of the load instruction 228. In one or more embodiments, once the verification testing is executing, the access of the address for the prefetch is attained and the respective benefiting instruction is prefetched from the accessed memory location as a prefetched cache line and is loaded into the determined cache.

Figure 3:
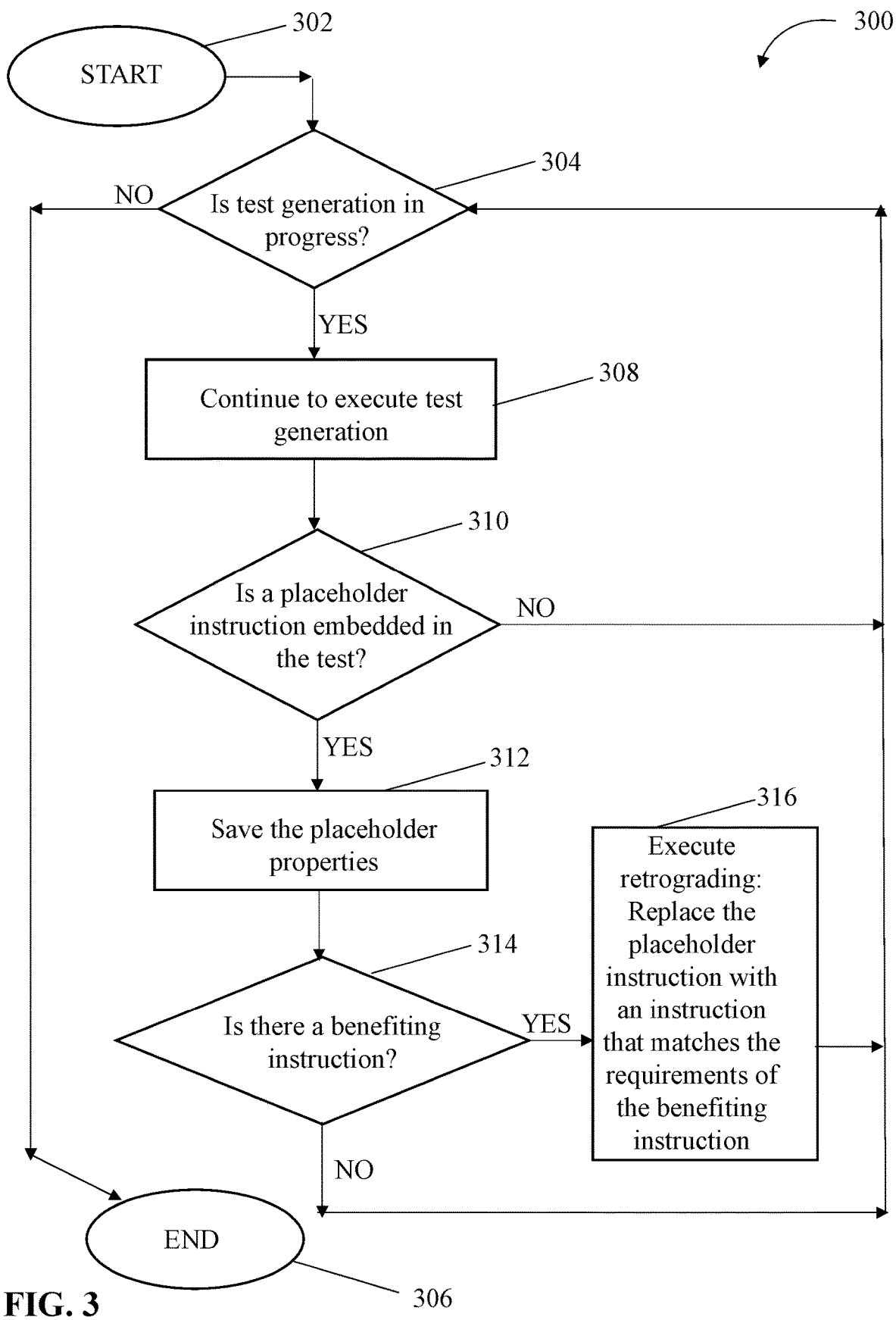
FIG. 3 is a flowchart illustrating a process for using placeholders when the placeholder instructions are embedded in the user scenario, in accordance with some embodiments of the present disclosure.

Referring to FIG. 3, a flowchart is presented illustrating a process 300 for using placeholders, i.e., the placeholder instruction 224 when the placeholder instructions 224 are embedded in the user scenario 200 (see FIG. 2A), in accordance with some embodiments of the present disclosure. Also referring to FIGS. 2A and 2B, the process 300 is started 302 and a determination 304 is made with respect to if the test generation is presently in progress. A "NO" result to the determination 304 ends 306 the process 300. A "YES" result to the determination 304 results in the test generation in process continuing 308 to execute. The process 300 proceeds to a determination 310 with respect to if a placeholder instruction, and specifically the placeholder instruction 224, is presently positioned (embedded) in the test, i.e., the user scenario 200 that determines the test case 240. If the result of the determination 310 is "NO," then the process 300 returns to the determination 304. If the result of the determination is "YES," the properties of the placeholder instruction 224 are saved 312 for further use in the testing process and the process 300 proceeds to a determination 314 if there is a benefiting instruction. A "NO" response to the determination 314 results in the process 300 returning to the determination 304. A "YES" response to the determination 314 results in the execution 316 of the retrograding process, i.e., the placeholder instruction 224 is replaced with a cache hint instruction, i.e., the DCBT instruction 245 that matches the requirements of the benefiting instruction. In some embodiments, one such requirement is that the DCBT instruction access the same cache line as the data access of the benefiting instruction. In some embodiments, another such requirement includes parameters on the number of instructions (sometimes referred to as "the distance") between the DCBT instruction and the benefiting instruction. In general, the parameters for the distance between instructions are at least partially subject to maintaining the other constraints placed on the respective instructions. The process 300 proceeds from the execution step 316 to the determination 304, where the process 300 continues for the duration of the test generation for testing the DUT. Accordingly, the DCBT instruction 245 influences the benefiting instruction.

Figure 4:
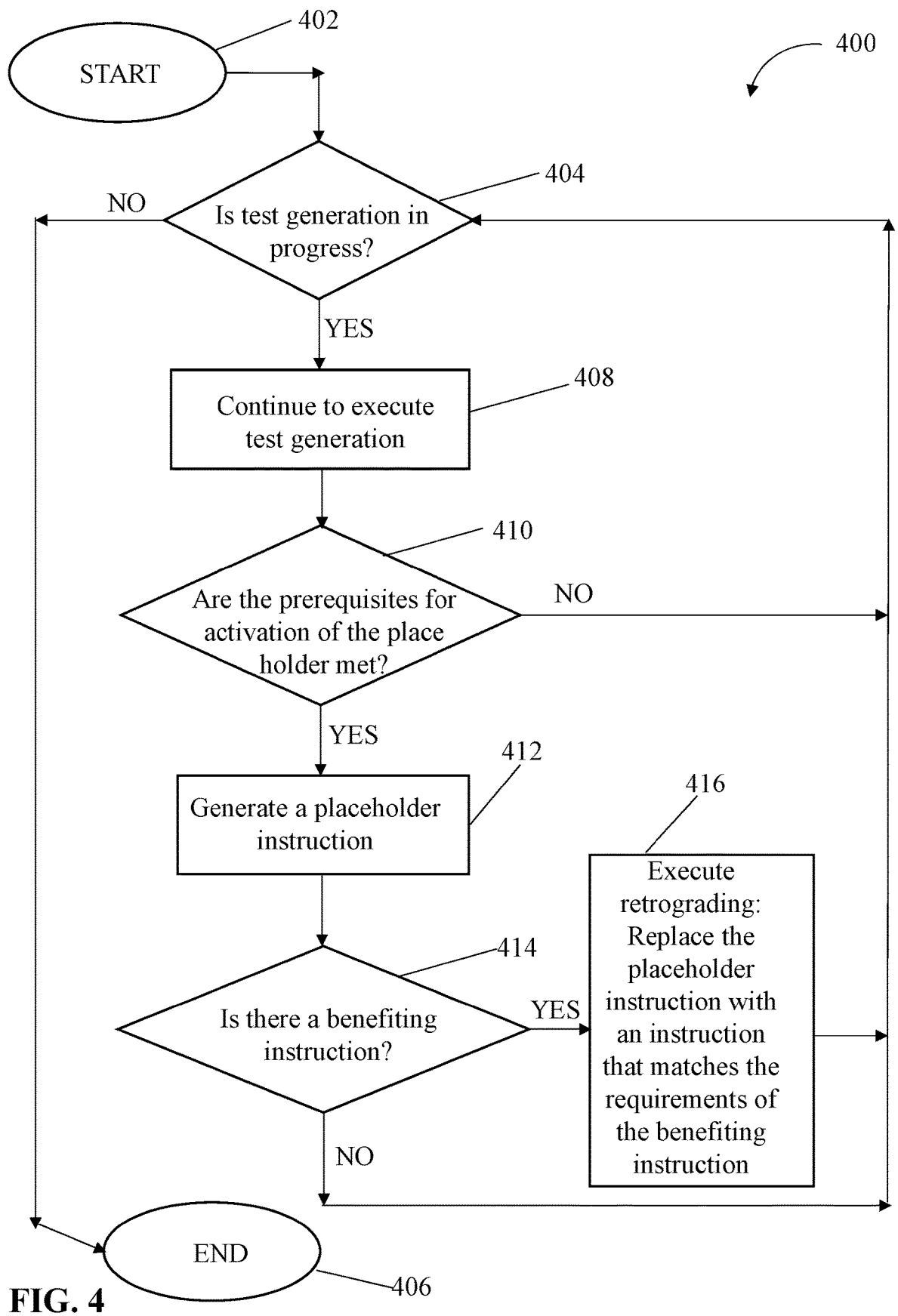
FIG. 4 is a flowchart illustrating a process for using placeholders when the placeholder instructions are generated, in accordance with some embodiments of the present disclosure.

Referring to FIG. 4, a flowchart is provided illustrating a process 400 for using placeholders, i.e., the placeholder instruction 224 when the placeholder instructions 224 are generated 226 for the user scenario 200 (see FIG. 2A), in accordance with some embodiments of the present disclosure. Also referring to FIGS. 2A and 2B, the process 400 is started 402 and a determination 404 is made with respect to if the test generation is presently in progress. A "NO" result to the determination 404 ends 406 the process 400. A "YES" result to the determination 404 results in the test generation in process continuing 408 to execute. The process 400 proceeds to a determination 410 with respect to if the prerequisites for activation of the placeholder instruction 224 are met. A "YES" response to the determination 410 results in the positioning. i.e., the generating 412 of the placeholder instruction 224 and the execution of the placeholder operation 222. A "NO" result of the determination 410 results in a return of the process 400 to the determination 404. Completion of the generating 412 of the placeholder instruction 224 into the test case 240 results in the process 400 proceeding to a determination 414 with respect to if there is a benefiting instruction. A "NO" response to the determination 414 results in the process 400 returning to the determination 404. A "YES" response to the determination 414 results in the execution 416 of the retrograding process, i.e., the placeholder instruction 224 is replaced with a cache hint instruction, i.e., the DCBT instruction 245 that matches the requirements of the benefiting instruction. The process 400 proceeds from the execution step 416 to the determination 404, where the process 400 continues for the duration of the test generation for testing the DUT.

Figure 5A:
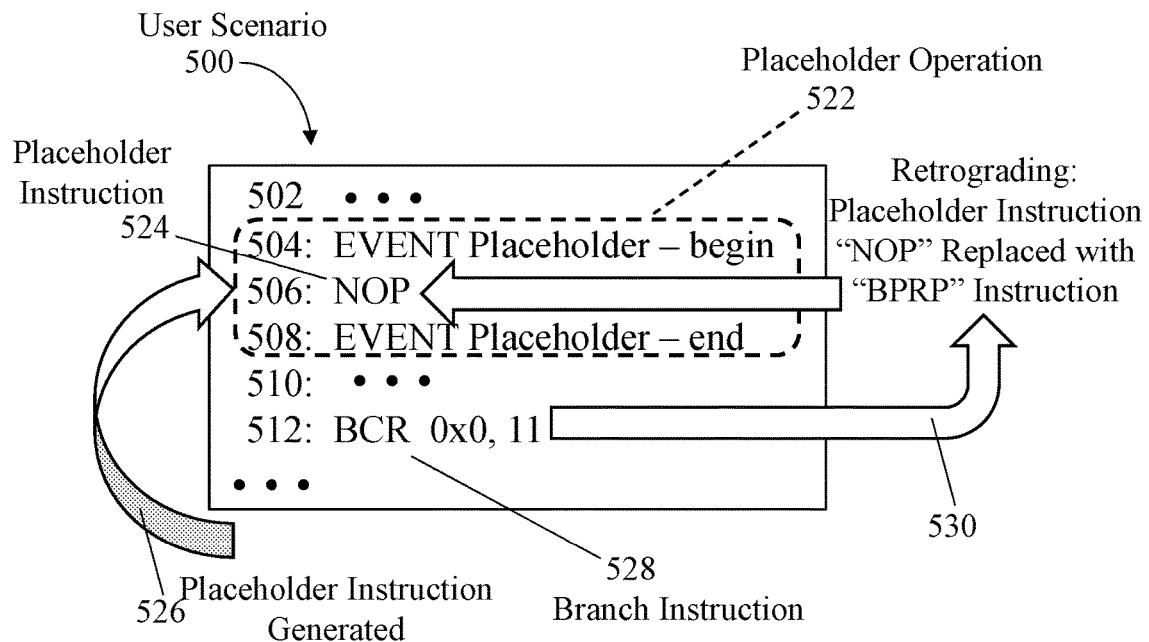
FIG. 5A is a block diagram illustrating a portion of a user scenario used with a random test generation process that may be executed on the computer system of FIG. 1, in accordance with some embodiments of the present disclosure.
Figure 5B:
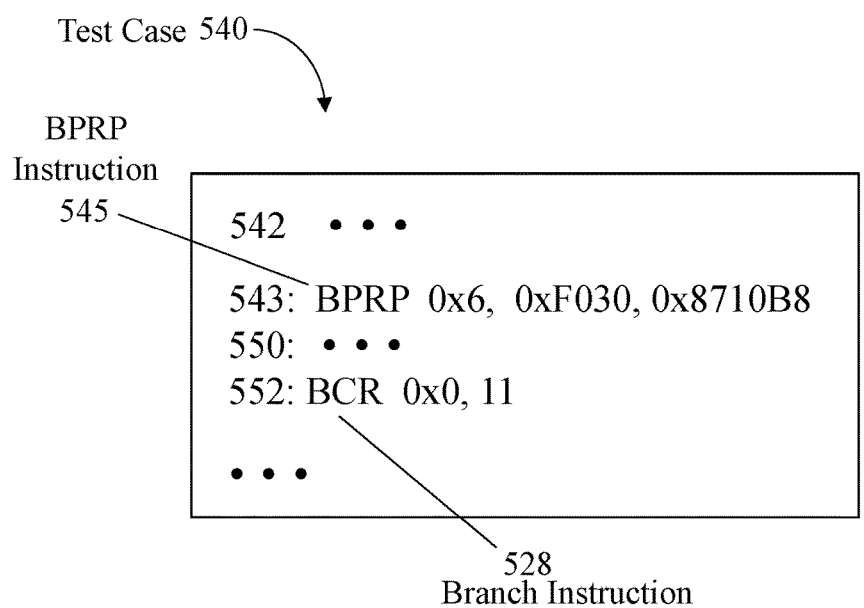
FIG. 5B is a block diagram illustrating a portion of a test case at least partially resulting from the user scenario of FIG. 5A, in accordance with some embodiments of the present disclosure.

Referring to FIG. 5A, a block diagram is presented illustrating a portion of a user scenario 500 used with a random test generation process that may be executed on the computer system 100 of FIG. 1, in accordance with some embodiments of the present disclosure. Also referring to FIG. 5B, a block diagram is presented illustrating a portion of a test case 540 at least partially resulting from the user scenario 500 of FIG. 5A, in accordance with some embodiments of the present disclosure. Further referring to FIGS. 2A and 2B, in at least some embodiments, the instruction lines 502 and 542 are similar to the instruction lines 202 and 242, respectively, with respect to that they are indicative of other instructions not pertinent to this disclosure. FIGS. 5A and 5B are presented to identify that the retrograding of certain instructions as described herein is agnostic to the architecture of the DUT and can be used for any operations that enable the system 100 as described herein. The user scenario 500, similar to the user scenario 200, is a branch prefetching scenario; however, the branch prefetching operations as described herein are non-limiting.

Referring to instruction line 502, at this point of the user scenario 500, the benefiting instruction is not yet identified. In at least some embodiments, an instruction line 504 is "EVENT Placeholder-begin" that initiates the placeholder operation 522 that is a portion of the retrograding process. In one or more embodiments, a following instruction line 506 is a placeholder instruction 524 that is generated 526 for the user scenario 500. In some embodiments, the placeholder instruction 524 is a no-operation (NOP) instruction, where the placeholder instruction 524 will be replaced by instructions later on during the retrograding. In at least some embodiments, the next instruction line 508 is "EVENT Placeholder-end" that ends the placeholder operation 522. Upon completion of the placeholder operation 522, any instruction lines 510 may be placed into the user scenario as at least partially defined by the user scenario 500.

In some embodiments, the last instruction line 512 for the portion of the user scenario 500 is a branch instruction 528 "BCR 0x0, 11." The BCR instruction represents a Branch-on-Conditional link instruction, i.e., the BCR instructions branch to an instruction specified by the branch target address as specified in the instruction through, for example, and without limitation, "0x0, 11". The instruction line 552 of the test case 540 corresponds to the instruction line 512 of the user scenario 500. In instruction line 543 that states "BPRP 0x6, 0xF030, 0x8710B8," BPRP is an abbreviation of Branch Prediction Relative Preload. The BPRP instructions and operations are similar to those for the DCBT instructions and operations; however, the BCR and BPRP instructions as presented in the instruction lines 512, 543, and 552 facilitate generating a "hint" for the associated branches, rather than the loading operations associated with the DCBT instructions. More specifically, in some embodiments, the retrograding process and respective instructions provide branch prediction hints to the DUT. The hints convey information such as, and without limitation, a distance of the branch instruction from the hint, a predicted address of the target (e.g., for early fetch), and the type of the branch, i.e., regular, returning linkage, etc. This information is collected upon generating the BCR instruction at instruction line 552, such that the retrograding process facilitates the DUT having the information well before the BCR instruction is generated.

Here, in the present embodiment, the test generation tool 130, and more specifically, the test case definition module 134 (both shown in FIG. 1) executes the branch instruction 528 of instruction line 542 through retrograding 530 the NOP placeholder instruction 524 with a retrograding instruction, more specifically, the respective cache hint instruction, i.e., BPRP instruction 545 resident in the memory address as identified through the branch instruction 528. A hint that the subject of the BPRP instruction 545, as defined by its operand, is going to access the cache line specified is provided through the instruction lines 506, 512/552, and 543. Accordingly, the benefiting instruction simulates more quickly with retrograding than without retrograding, where such benefits may also be realized in a physical version of the design-under-test. A hint was provided that indicates to the microprocessor that an address might be accessed later on, hence prompting it to bring the corresponding data into the cache before the benefiting instruction is executed.

In some embodiments, once the branch instruction 528 of instruction line 512/552 is generated, if there were several previous NOP insertions that could be chosen, then the test generation tool 130, and more specifically, the test case definition module 134, could pick the previous NOP insertion that would optimize the portion of the user scenario 500 that was triggered. In the instance of the BPRP instruction 545, picking the NOP instruction that is further back in time, as opposed to an NOP instruction that was only a few instructions before the branch instruction 528 of instruction lines 512/552 (i.e., the designated branch instruction), would be beneficial as it would allow the microprocessor more time to get the data specified by the BPRP instruction 545 into the respective cache so that it's available when the BPRP instruction 545 executes.

In some embodiments, including, without limitation, the prefetching embodiments described herein, for example, the BCR and BPRP instructions bringing the respective memory address into the cache so that a branch to that address can execute more quickly, thereby substantially eliminating those latencies associated with waiting for the respective data to be retrieved from memory, is but one feature of the design-under-test that is tested (triggered) through the simulation-based verification of the DUT. Accordingly, those mechanisms associated with the DUT are activated during the verification testing, including, without limitation, bug exceptions, are implemented through the verification process to verify the respective design behaviors.

Figure 6A:
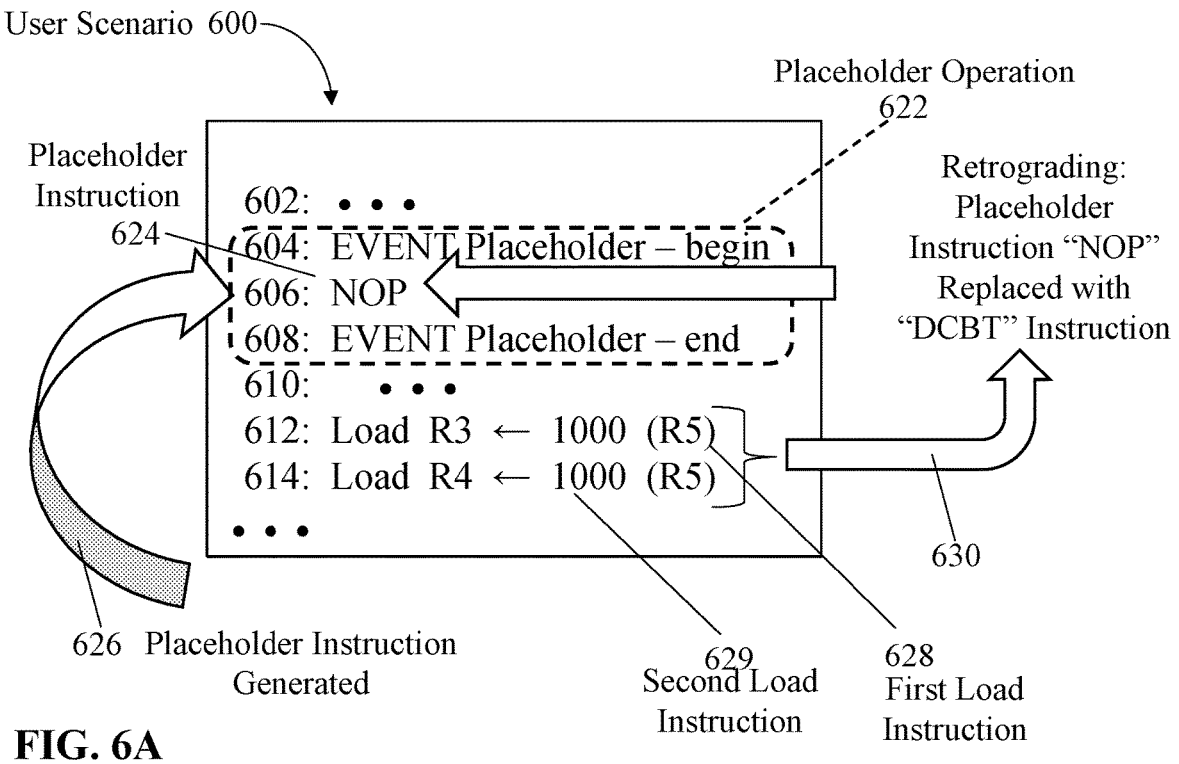
FIG. 6A is a block diagram illustrating a portion of a user scenario configured for a single placeholder retrograding scheme that may be executed on the computer system of FIG. 1, in accordance with some embodiments of the present disclosure

Referring to FIG. 6A, a block diagram is presented illustrating a portion of a user scenario 600 configured for a single placeholder retrograding scheme that may be executed on the computer system 100 of FIG. 1, in accordance with some embodiments of the present disclosure. Also, referring to FIG. 6B, a block diagram is presented illustrating a portion of a test case 640 at least partially resulting from the user scenario 600 of FIG. 6A, in accordance with some embodiments of the present disclosure.

Also referring to FIGS. 2A and 2B, in at least some embodiments, the instruction lines 602 and 632 are similar to the instruction lines 202 and 242, respectively. In at least some embodiments, the instruction lines 604, 606, 608, and 610 (and 650) are similar to instruction lines 204, 206, 208, and 210 (and 250), respectively. Accordingly, the placeholder operation 622 is similar to the placeholder operation 222. In one or more embodiments, the instruction line 606 includes a placeholder instruction 624 that is generated 626 for the user scenario 600. In some embodiments, the placeholder instruction 624 is a NOP instruction as previously described.

In some embodiments, the portion of the user scenario 600 and the test case 640 include instruction lines 612 and 652 that include a first load instruction 628 of "Load R3←1000 (R5)." As such, instruction lines 612 and 652 are similar to the instruction lines 212 and 252. The load instruction 628 of the instruction lines 612 and 652 identifies the memory address defined by the operation (R5+1000) and loads that address of that memory location into the register R3. This action results in identifying a memory address that will be later accessed through a subsequent retrograding instruction, e.g., a DCBT instruction 645, is resident (see instruction line 643, with the operands of registers R1 and R2). The associated operands of registers R1 and R2 are used in a manner similar to that for instruction line 243 with the associated operands of registers R0 and R10. The DCBT instruction 645 will occupy the same memory address where the placeholder instruction 624 is resident. Accordingly, the retrograding instruction (the DCBT instruction 645) that could replace the placeholder instruction 624 and the respective memory access of the retrograding instruction, are identified.

Similarly, the next instruction line 614 (and 654) includes a second load instruction 629 of "Load R4←1000 (R5)." As such, instruction lines 614 and 654 are similar to the instruction lines 612 and 652. The load instruction 629 of the instruction lines 614 and 654 identifies the memory address defined by the operation (R5+1000) and loads the address of that memory location into the register R4. This action results in identifying a memory address that will be later accessed through a subsequent retrograding instruction, e.g., a DCBF (data cache block flush) instruction 649 (see instruction line 647, with the operands of registers R6 and R7). The associated operands of registers R6 and R7 are used in a manner similar to that for instruction line 243 with the associated operands of registers R0 and R10. Accordingly, the retrograding instruction that could replace the placeholder instruction 624 and the respective memory access of the retrograding instruction, are identified. The number of two load instructions 628 and 629 is non-limiting.

In some embodiments, as described above, the DCBT instruction 645 could be used to replace the NOP placeholder instruction 624, or the DCBF instruction 649 could be used to replace the NOP placeholder instruction 624, where such determinations may be either instructed by the user or selected at random during the verification operations of the DUT. In some embodiments, the DCBT instruction 645 serves the first load instruction 628 and the DCBF instruction 649 serves the second load instruction 629. In some embodiments, the DCBT instruction 645 serves the second load instruction 629 and the DCBF instruction 649 serves the first load instruction 628. In some embodiments, there are at least two NOP placeholder instructions 624 that are replaced with a respective DCBT instruction 645 and DCBF instruction 649.

In some embodiments, the retrograding 630 of the NOP instruction of instruction line 606 is executed, i.e., retrograded through one of the DCBT instruction 645 and the DCBF instruction 649, where the respective memory access is provided by one of instruction line 652 (from the register R3) or the instruction line 654 (the register R4), respectively. Therefore, in some embodiments, a selection between the instruction lines 612/652 and 614/654 will be executed as previously described. In some embodiments, the test generation tool 130, and more specifically, the test case definition module 134, will pick one of the load instruction lines 612/652 or load instruction lines 614/654 as a function of the timing of the access to each of the registers R3 and R4.

Figure 7A:
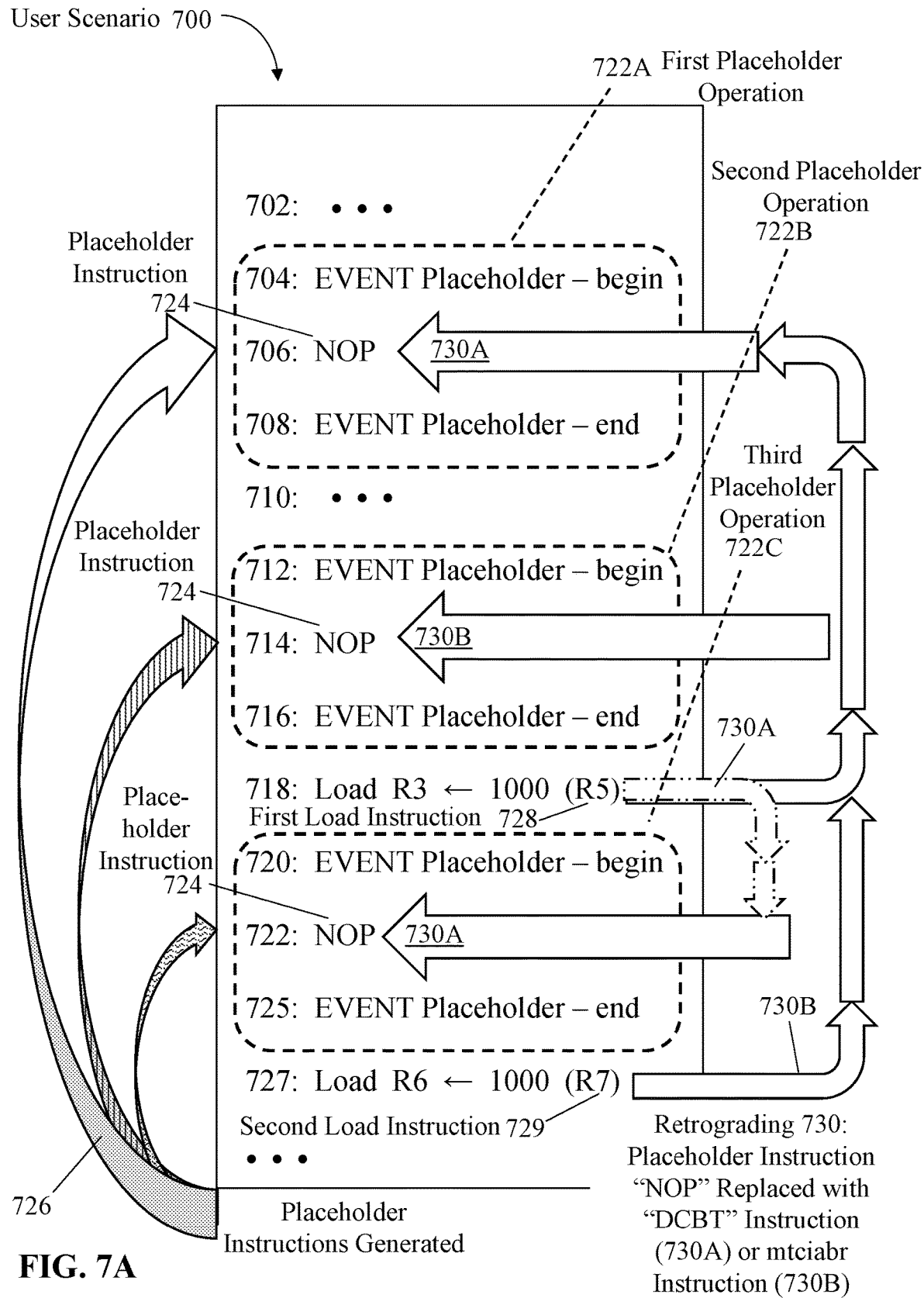
FIG. 7A is a block diagram illustrating a portion of a three placeholder retrograding scheme that may be executed on the computer system of FIG. 1, in accordance with some embodiments of the present disclosure.
Figure 7B:
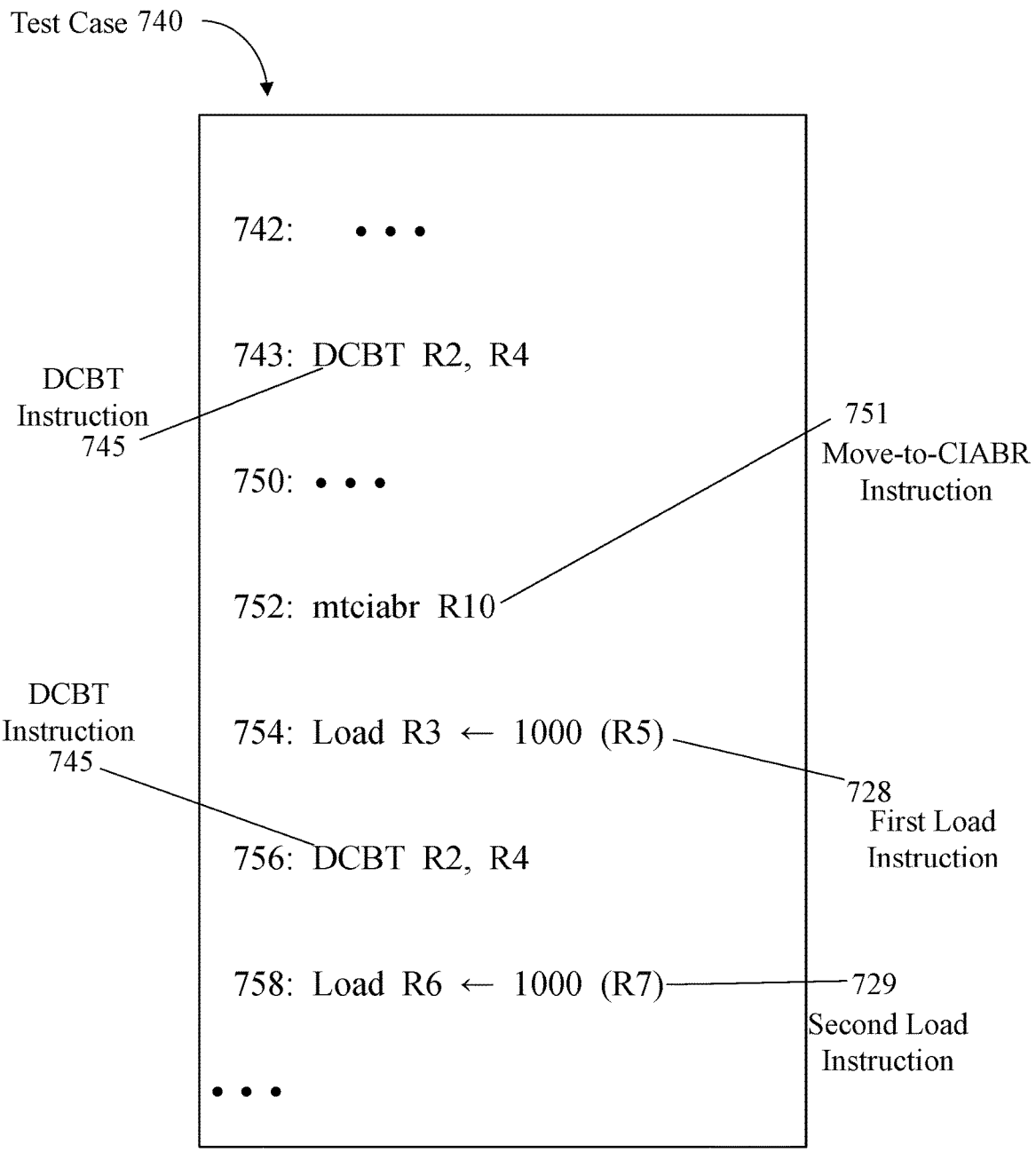
FIG. 7B is a block diagram illustrating a portion of a test case at least partially resulting from the user scenario of FIG. 7A, in accordance with some embodiments of the present disclosure.

Referring to FIG. 7A, a block diagram is presented illustrating a portion of a user scenario 700 configured for a three placeholder retrograding scheme that may be executed on the computer system 100 of FIG. 1, in accordance with some embodiments of the present disclosure. Also, referring to FIG. 7B, a block diagram is presented illustrating a portion of a test case 740 at least partially resulting from the user scenario 700 of FIG. 7A, in accordance with some embodiments of the present disclosure.

Figure 6B:
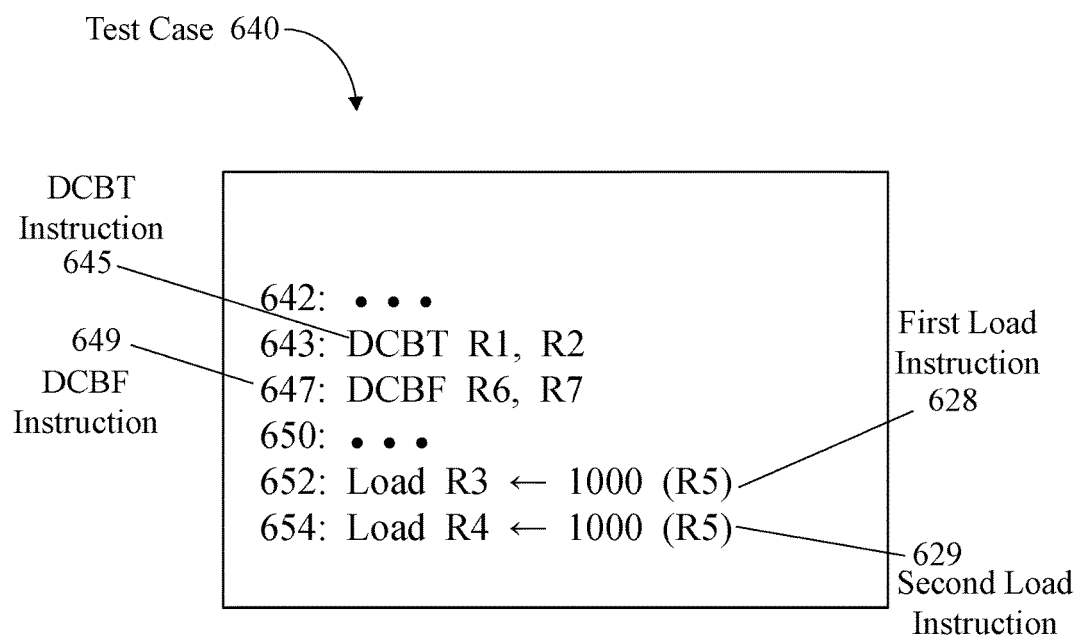
FIG. 6B is a block diagram illustrating a portion of a test case at least partially resulting from the user scenario of FIG. 6A, in accordance with some embodiments of the present disclosure.

Also referring to FIGS. 6A and 6B, in at least some embodiments, the instruction lines 702 and 742 are similar to the instruction lines 602 and 642, respectively. In at least some embodiments, the instruction lines 704, 706, 708, and 710 (and 750) are similar to the instruction lines 604, 606, 608, and 610 (and 650), respectively. Similarly, the instruction lines 712, 714, and 716, and the instruction lines 720, 722, and 725, are similar to the instruction lines 704, 706, and 708. Accordingly, the first placeholder operation 722A, the second placeholder operation 722B, and the third placeholder operation 722C are similar to the placeholder operation 622. In one or more embodiments, the instruction lines 706, 714, and 722 include a placeholder instruction 724 that is determined and generated 726 for the user scenario 700. In some embodiments, the placeholder instructions 724 are a NOP instruction as previously described. In some embodiments, at least a portion of the placeholder instructions 724 are substantially similar, and in some embodiments, at least a portion of the placeholder instructions 724 are different. The number of three placeholder operations 722 is non-limiting.

In one or more embodiments, each load instruction may affect different placeholders in different ways. For example, and without limitation, one load instruction for one placeholder may be replaced by a DCBT instruction and another load instruction for another placeholder may be replaced by a move-to-CIABR instruction. A move-to-CIABR instruction 751, i.e., "mtciabr R10" is presented, where CIABR is an abbreviation for Completion Instruction Address Breakpoint Register, and it is presented at instruction line 752. In general, debugging tools used by programmers and software engineers are configured to modify an instruction stream by replacing an instruction with an exception or a branch that allows the debugger to take control of the program. However, for certain applications, it is not possible or desirable to modify the instruction stream in this manner. In these cases, programmers may utilize a CIABR instruction that allows a debugger to specify an instruction address, which, when hit, will cause an interrupt in the DUT that will transfer control to the debugger. In general, the DCBT instructions (as well as the DCBF instructions introduced above) and the mtciabr instructions typically do not influence each other.

Accordingly, as discussed further herein, the present move-to-CIABR instruction 751 is used to replace the placeholder instruction 724.

In some embodiments, the portion of the user scenario 700 and the test case 740 include instruction lines 718 and 754 that include a first load instruction 728 of "Load R3←1000 (R5)." As such, instruction lines 718 and 754 are similar to the instruction lines 612 and 652 as previously discussed. Similarly, the instruction lines 727 and 748 include a second load instruction 729 of "Load R6←1000 (R7)." As such, instruction lines 727 and 758 are similar to the instruction lines 614 and 654 as previously discussed. However, here, the first load instruction 728 is directed toward a DCBT instruction and the second load instruction 729 is directed toward a mtciabr instruction. In addition, either one of the load instructions 728 and 729 can affect more than one placeholder instruction, e.g., in some embodiments, replace one placeholder instruction with a DCBT instruction and the other placeholder instruction with a mtciabr instruction.

In some embodiments, the retrograding 730A of the NOP placeholder instruction 724 of instruction lines 706 and 722 is executed where the DCBT instructions 745 replace the respective NOP placeholder instructions 724. In contrast, the retrograding 730B of the NOP placeholder instruction 724 of instruction line 714 is executed where the mtciabr instruction 751 replaces the respective NOP placeholder instruction 724. Therefore, in this embodiment, a selection between the instruction lines 718/754 (for the retrograding 730A with the DCBT instruction 745) and 727/758 (for the retrograding 730B with the mtciabr instruction 751) will be executed. In some embodiments, the test generation tool 130, and more specifically, the test case definition module 134, will pick the DCBT instruction lines 718/754 or the mtciabr instruction lines 727/758 as a function of the timing of the access to each of the registers R3 and R6. Accordingly, any number of retrogrades 730A and 730B, any number of placeholder instructions 724, and any retrograding instructions are used the enable operation of the system 100 as described herein.

The embodiments as disclosed and described herein are configured to provide an improvement to the technological field associated with testing of designs, i.e., designs of microprocessors. As such, the embodiments described herein integrate the use of placeholder instructions in conjunction with retrograding instructions to identify those instructions that will benefit from retrograding the placeholder instructions to enhance random test generation. Accordingly, the embodiments presented herein are directed toward enhancing random test generation for verification of simulated hardware designs prior to physical manufacturing.

The embodiments described herein facilitate the aforementioned integration into a practical application of a computer system, computer readable storage medium, and computer-implemented method for retrograding an instruction stream to enhance random test generation during pre-silicon verification testing. Specifically, the design verification features presented herein include employing a test generation apparatus that takes a high-level verification scenario description and produces a machine-language testcase that directs the test generator to insert a set of placeholders for instruction seeding to enhance the execution of operations that can benefit from the insertion of the enhancing instructions. Such retrograding is executed automatically, and randomly, thereby expanding the range of the verification scenarios. Specifically, for example, the placeholders are replaced with instructions that modify the microarchitectural behavior of the test without affecting its architectural validity. Such mechanisms facilitate generating multiple tests for the same scenario with one or more additional verification testing dimensions that differ from each other to enhance the user's efforts directed toward the quality of the respective verifications.

Furthermore, the embodiments described herein facilitate verification of the hint instructions injected into the respective verification test streams, thereby practically increasing the verification environment event coverage significantly, i.e., in excess of 50% on some platforms. Moreover, the extended verification coverage as presented through the desired interaction is maintained between the benefiting instruction and the retrograding instruction does not increase a probability of violating any sequential instruction validity requirements, thereby preventing the generation of illegal test results.

Additionally, the embodiments described herein are applicable to any environment that can benefit from the retrograding operations as presented herein. Such embodiments may include, without limitation, those "planning" or "planned" operations that use planned user scenarios to implement a planned series of operations to achieve some goal. Accordingly, any planning/planned operations may benefit from increased randomization of portions of the planned scenarios.

The placeholder instructions 224 are agnostic to the user scenarios and are configured to facilitate the retrograding process, where the retrograding instructions mesh into the user scenarios when the respective retrogrades take place. In this way, an existing scenario that is designed to target some specific verification requirement will also target other verification aspects without any modification to the original scenario.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
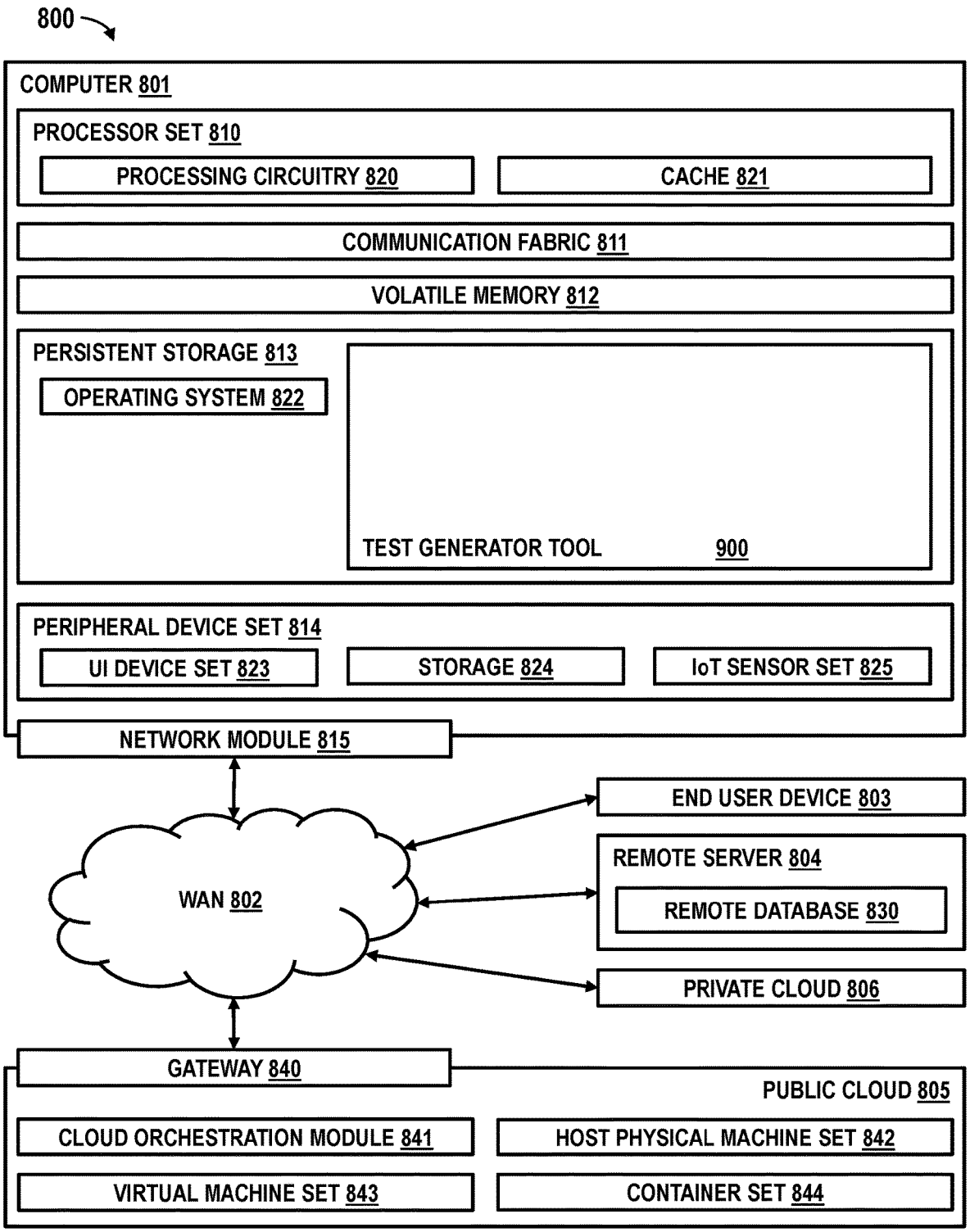
FIG. 8 is as block schematic diagram illustrating an example of a computing environment for the execution of at least some of the computer code involved in performing the disclosed methods described herein, in accordance with some embodiments of the present disclosure.

Referring to FIG. 8, a block schematic diagram is presented illustrating an example of a computing environment for the execution of at least some of the computer code involved in performing the disclosed methods described herein, in accordance with some embodiments of the present disclosure.

Computing environment 800 contains an example of an environment for the execution of at least some of the computer code involved in performing the disclosed methods, such as test generator tool 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 821 and the other storage media discussed below. The program instructions, and associated data, are accessed by processor set 810 to control and direct performance of the disclosed methods. In computing environment 800, at least some of the instructions for performing the disclosed methods may be stored in block 900 in persistent storage 813.

Communication fabric 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the disclosed methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the disclosed methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801.

Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for retrograding an instruction stream to enhance random test generation comprising:
   a random test generation system comprising a processor and configured to:
   generate a test case for a design-under-test (DUT) comprising:
   position one or more placeholder instructions in the test case;
   identify one or more benefiting instructions; and
   generate one or more load instructions configured to identify one or more respective memory addresses that are to be accessed through one or more respective retrograding instructions; and
   execute the test case, by replacing the one or more placeholder instructions into the one or more respective retrograding instructions, wherein the one or more retrograding instructions influence the one or more benefiting instructions.

2. The computer system of claim 1, the random test generation system is further configured to:
   determine one or more requirements of the one or more benefiting instructions.

3. The computer system of claim 2, the random test generation system is further configured to:
   replace the one or more placeholder instructions with the one or more respective retrograding instructions that match the one or more requirements of the one or more benefiting instructions; and
   replace the one or more placeholder instructions with one or more other instructions that are not the one or more respective retrograding instructions, when the one or more other instructions at least partially match the one or more requirements of the one or more benefiting instructions.

4. The computer system of claim 1, wherein the one or more placeholder instructions comprise a plurality of placeholder instructions, the random test generation system is further configured to:
   position one or more first placeholder instructions of the plurality of placeholder instructions in the test case; and
   position one or more second placeholder instructions of the plurality of placeholder instructions in the test case comprising:
   determine the one or more second placeholder instructions to position in the test case; and
   generate the one or more second placeholder instructions for the test case.

5. The computer system of claim 1, wherein the one or more retrograding instructions comprise one or more cache hint instructions.

6. The computer system of claim 1, wherein:
the one or more placeholder instructions are no-operation (NOP) instructions; and
the one or more retrograding instructions are one of:
a Data Cache Block Touch (DCBT) instruction; and
a Branch Prediction Relative Preload (BPRP) instruction.

7. The computer system of claim 1, wherein:
at least a portion of the one or more placeholder instructions are one or more partially formed retrograding instructions, the random test generation system is further configured to:
replace the portion of the one or more placeholder instructions that are not partially formed retrograding instructions; and
modify the one or more partially formed retrograding instructions into fully formed retrograding instructions.

8. A computer readable storage medium having computer executable instructions that when executed by at least one computing device for retrograding an instruction stream to enhance random test generation, comprising instructions to:
generate a test case for a design-under-test (DUT) comprising instructions to:
position one or more placeholder instructions in the test case;
identify one or more benefiting instructions; and
generate one or more load instructions configured to identify one or more respective memory addresses that are to be accessed through one or more respective retrograding instructions; and
execute the test case, by replacing the one or more placeholder instructions into the one or more respective retrograding instructions, wherein the one or more retrograding instructions influence the one or more benefiting instructions.

9. The computer readable storage medium of claim 8, further comprising instructions to:
determine one or more requirements of the one or more benefiting instructions.

10. The computer readable storage medium of claim 9, further comprising instructions to:
replace the one or more placeholder instructions with the one or more respective retrograding instructions that match the one or more requirements of the one or more benefiting instructions; and
replace the one or more placeholder instructions with one or more other instructions that are not the one or more respective retrograding instructions, when the one or more other instructions at least partially match the one or more requirements of the one or more benefiting instructions.

11. The computer readable storage medium of claim 8, wherein the one or more placeholder instructions comprise a plurality of placeholder instructions, the computer readable storage medium further comprising instructions to:
position one or more first placeholder instructions of the plurality of placeholder instructions in the test case; and
position one or more second placeholder instructions of the plurality of placeholder instructions in the test case comprising instructions to:
determine the one or more second placeholder instructions to position in the test case; and
generate the one or more second placeholder instructions for the test case.

12. The computer readable storage medium of claim 8, wherein the one or more retrograding instructions comprise one or more cache hint instructions.

13. The computer readable storage medium of claim 8, wherein:
the one or more retrograding instructions comprise one or more cache hint instructions; and
at least a portion of the one or more placeholder instructions are one or more partially formed retrograding instructions, the computer readable storage medium further comprising instructions to:
replace the portion of the one or more placeholder instructions that are not partially formed retrograding instructions; and
modify the one or more partially formed retrograding instructions into fully formed retrograding instructions.

14. A computer-implemented method for retrograding an instruction stream to enhance random test generation comprising:
generating a test case for a design-under-test (DUT) comprising:
positioning one or more placeholder instructions in the test case;
identifying one or more benefiting instructions; and
generate one or more load instructions configured to identify one or more respective memory addresses that are to be accessed through one or more respective retrograding instructions; and
executing the test case, by replacing the one or more placeholder instructions into the one or more respective retrograding instructions, wherein the one or more retrograding instructions influence the one or more benefiting instructions.

15. The method of claim 14, further comprising:
determining one or more requirements of the one or more benefiting instructions.

16. The method of claim 15, wherein the one or more placeholder instructions comprises:
replacing the one or more placeholder instructions with the one or more respective retrograding instructions that match the one or more requirements of the one or more benefiting instructions; and
replacing the one or more placeholder instructions with one or more other instructions that are not the one or more respective retrograding instructions, when the one or more other instructions at least partially match the one or more requirements of the one or more benefiting instructions.

17. The method of claim 14, wherein the one or more placeholder instructions comprise a plurality of placeholder instructions, and the positioning the one or more placeholder instructions in the test case comprises one or more of:
positioning one or more first placeholder instructions of the plurality of placeholder instructions in the test case; and
positioning one or more second placeholder instructions in the test case comprising:
determining the one or more second placeholder instructions to position in the test case; and
generating the one or more second placeholder instructions for the test case.

18. The method of claim 14, wherein the one or more retrograding instructions comprise one or more cache hint instructions.

19. The method of claim 14, wherein:
the one or more placeholder instructions are no-operation (NOP) instructions; and
the one or more retrograding instructions are one of:
- a Data Cache Block Touch (DCBT) instruction; and
- a Branch Prediction Relative Preload (BPRP) instruction.

20. The method of claim 14, wherein:
at least a portion of the one or more placeholder instructions are one or more partially formed retrograding instructions, wherein the method further comprises:
- replacing the portion of the one or more placeholder instructions that are not partially formed retrograding instructions; and
- modifying the one or more partially formed retrograding instructions into fully formed retrograding instructions.

* * * * *